United States Patent [19]

Evoy

[11] Patent Number: 5,787,294
[45] Date of Patent: Jul. 28, 1998

[54] SYSTEM FOR REDUCING THE POWER CONSUMPTION OF A COMPUTER SYSTEM AND METHOD THEREFOR

[75] Inventor: David R. Evoy, Tempe, Ariz.

[73] Assignee: VLSI Technology, Inc., San Jose, Calif.

[21] Appl. No.: 542,498

[22] Filed: Oct. 13, 1995

[51] Int. Cl.$^6$ .................. G06F 1/00; G06F 1/18; G06F 1/26
[52] U.S. Cl. .................. 395/750.03; 395/750.08; 364/707; 331/143; 323/222
[58] Field of Search .................. 395/750, 182.12, 395/750.03, 750.07, 750.08; 364/707; 323/222, 223, 232, 234; 320/31, 35, 39, 40; 331/143

[56] References Cited

U.S. PATENT DOCUMENTS

| | | | |
|---|---|---|---|
| 5,153,535 | 10/1992 | Fairbanks et al. | 331/143 |
| 5,307,003 | 4/1994 | Fairbanks et al. | 323/222 |
| 5,404,543 | 4/1995 | Faucher et al. | 395/750 |
| 5,535,401 | 7/1996 | Rawson, III et al. | 395/750 |
| 5,541,490 | 7/1996 | Sengupta et al. | 320/12 |
| 5,557,738 | 9/1996 | Townsley et al. | 395/182.12 |
| 5,560,022 | 9/1996 | Dunstan et al. | 395/750 |
| 5,586,333 | 12/1996 | Choi et al. | 395/750 |
| 5,617,572 | 4/1997 | Pearce et al. | 395/750 |
| 5,629,604 | 5/1997 | Sengupta et al. | 320/31 |

*Primary Examiner*—Ayaz R. Sheikh
*Assistant Examiner*—Raymond N. Phan
*Attorney, Agent, or Firm*—Harry M. Weiss; Jeffrey D. Moy; Harry M. Weiss & Associates, P.C.

[57] ABSTRACT

The present invention relates to a system and method for reducing the power consumption of a computer system, more specifically a notebook computer system. The system comprises a programmable frequency generator and a programmable power supply which alters the current operating frequency and voltage of the computer's microprocessor to match current operating conditions. If the microprocessor is not doing any meaningful work, the programmable frequency generator and the programmable power supply can reduce both the operating frequency and voltage thereby lowering the power consumption of the computer system based on the formula: power=voltage$^2$×frequency. It should be noted that the programmable frequency generator and the programmable power supply may be attached to other system components in the computer system that consume a large amount of the computer system's power.

25 Claims, 3 Drawing Sheets

CLOCK THROTTLE ONLY

| DESIRED FREQ % | FREQ ASSUMED % | VOLTAGE % | V*V*F % | POWER SAVED BY V*V*F % | CLOCK THROTTLE % | POWER SAVE BY THROTTLE % | TOTAL POWER SAVINGS % | POWER USE % |
|---|---|---|---|---|---|---|---|---|
| 100 | 100 | 100 | 100 | 0 | 0 | 0.00 | 0 | 100 |
| 90 | 100 | 100 | 100 | 0 | 10 | 8.00 | 8 | 92 |
| 80 | 100 | 100 | 100 | 0 | 20 | 16.00 | 16 | 84 |
| 70 | 100 | 100 | 100 | 0 | 30 | 24.00 | 24 | 76 |
| 60 | 100 | 100 | 100 | 0 | 40 | 32.00 | 32 | 68 |
| 50 | 100 | 100 | 100 | 0 | 50 | 40.00 | 40 | 60 |
| 40 | 100 | 100 | 100 | 0 | 60 | 48.00 | 48 | 52 |
| 30 | 100 | 100 | 100 | 0 | 70 | 56.00 | 56 | 44 |
| 20 | 100 | 100 | 100 | 0 | 80 | 64.00 | 64 | 36 |
| 10 | 100 | 100 | 100 | 0 | 90 | 72.00 | 72 | 28 |
| 0 | 100 | 100 | 100 | 0 | 100 | 80.00 | 80 | 20 |

CONSERVATIVE V*V*F WITH CLOCK THROTTLE

| DESIRED FREQ % | FREQ ASSUMED % | VOLTAGE % | V*V*F % | POWER SAVED BY V*V*F % | CLOCK THROTTLE % | POWER SAVE BY THROTTLE % | TOTAL POWER SAVINGS % | POWER USE % |
|---|---|---|---|---|---|---|---|---|
| 100 | 100 | 100 | 100 | 0 | 0 | 0 | 0 | 100 |
| 90 | 90 | 100 | 90 | 10 | 0 | 0 | 10 | 90 |
| 80 | 80 | 100 | 80 | 20 | 0 | 0 | 20 | 80 |
| 70 | 70 | 100 | 70 | 30 | 0 | 0 | 30 | 70 |
| 60 | 60 | 100 | 60 | 40 | 0 | 0 | 40 | 60 |
| 50 | 50 | 80 | 32 | 68 | 0 | 0 | 68 | 32 |
| 40 | 50 | 80 | 32 | 68 | 20 | 5 | 73 | 27 |
| 30 | 50 | 80 | 32 | 68 | 40 | 10 | 78 | 22 |
| 20 | 50 | 80 | 32 | 68 | 60 | 15 | 83 | 17 |
| 10 | 50 | 80 | 32 | 68 | 80 | 20 | 88 | 12 |
| 0 | 50 | 80 | 32 | 68 | 100 | 26 | 94 | 6 |

Fig. 3

AGGRESSIVE V*V*F

| DESIRED FREQ % | FREQ ASSUMED % | VOLTAGE % | V*V*F % | POWER SAVED BY V*V*F % | CLOCK THROTTLE % | POWER SAVE BY THROTTLE % | TOTAL POWER SAVINGS % | POWER USE % |
|---|---|---|---|---|---|---|---|---|
| 100 | 100 | 100 | 100 | 0 | 0 | 0 | 0 | 100 |
| 90 | 90 | 95 | 81 | 19 | 0 | 0 | 19 | 81 |
| 80 | 80 | 90 | 65 | 35 | 0 | 0 | 35 | 65 |
| 70 | 70 | 85 | 51 | 49 | 0 | 0 | 49 | 51 |
| 60 | 60 | 80 | 38 | 62 | 0 | 0 | 62 | 38 |
| 50 | 50 | 75 | 28 | 72 | 0 | 0 | 72 | 28 |
| 40 | 40 | 70 | 20 | 80 | 0 | 0 | 80 | 20 |
| 30 | 30 | 65 | 13 | 87 | 0 | 0 | 87 | 13 |
| 20 | 20 | 60 | 7 | 93 | 0 | 0 | 93 | 7 |
| 10 | 10 | 55 | 3 | 97 | 0 | 0 | 97 | 3 |
| 0 | 0 | 50 | 0 | 100 | 0 | 0 | 100 | 0 |

Fig. 4

| METHOD | POWER CONSUMED | NOTES |
|---|---|---|
| CLOCK THROTTLE | 60% | ASSUMING 100% THROTTLE LOWERS POWER TO 20%, (TYPICAL) THEN 50% THROTTLE REDUCES POWER TO 60%, A 40% SAVINGS. |
| FREQUENCY CONTROL | 50% | LOWERING THE FREQUENCY TO 50% IS VERY CLOSE TO 50% SAVINGS. |
| $V^2F$, WITH 10% VOLTAGE REDUCTION | 40% | .9 x .9 x .5 = .405 |
| $V^2F$, WITH 20% VOLTAGE REDUCTION | 32% | .8 x .8 x .5 = .32 |
| $V^2F$, WITH 30% VOLTAGE REDUCTION | 25% | .7 x .7 x .5 = .245 |

5,787,294

1

SYSTEM FOR REDUCING THE POWER CONSUMPTION OF A COMPUTER SYSTEM AND METHOD THEREFOR

BACKGROUND OF THE INVENTION

1. Field of the Invention

This invention relates generally to computer systems and, more specifically, to a system and method for reducing the power consumption of a notebook computer thereby extending the life of the battery so that the notebook computer may continue to operate for a longer period of time without having to recharge the battery.

2. Description of the Prior Art

The power consumed by a computer system is determined by the equation:

$$P = V^2 \times F$$

where P is the power consumed,

V is the operating voltage of the computer system, and

F is the operating frequency of the computer system.

The operating voltage of the computer system is generally set at a fixed value that assures the operation of the computer system at a maximum frequency. Although the operating voltage is generally set at a fixed value, the power consumed by the computer system may still be reduced. Some notebook computers vary the frequency of the processor interface thereby lowering the power consumption of the computer system. However, most notebook computers use a method called clock throttling to lower the power consumption of the microprocessor and hence the power consumption of the computer system. Under this method, when a microprocessor is deemed not to be doing meaningful work, an input to the microprocessor is changed which effectively tells the microprocessor to stop using its clock internally. Although, the system clock remains running under this method, by changing the input to the microprocessor, the microprocessor is slowly throttled back so that the microprocessor will not burn as much energy (i.e., it is like telling the microprocessor to go idle)—thereby reducing the power consumption of the computer system.

While the above methods do result in a reduction of power consumption, none of the methods are combined with a reduction in the operating voltages of the plurality of system components in the computer system in order to further reduce the power consumption of the computer system. Controlling both the operating frequencies and operating voltages of each of a plurality of system components (i.e. the system components that consume the most energy) allows for optimal power and performance tradeoffs in the computer system. This includes lowering the voltage as frequency decreases for the lowest possible power consumption and increasing the voltage to allow for robust operation at increased microprocessor speeds. Furthermore, when both the frequency and voltage are controlled, the voltage may be increased prior to increasing the frequency, and the frequency may be decreased prior to decreasing the voltage. This assures that the system does not run at a frequency that is too fast for the current voltage, thus resulting in further power savings.

By controlling both the operating frequency and voltage of the computer system, not only is power consumption reduced, but the computer system benefits in several other ways. First, thermal control is improved. By controlling both the operating frequency and voltage of the computer system,

2 greater frequencies may be used for a given thermal limit. This is due to the fact that the frequency does not have to be reduced as far when both the frequency and voltage are reduced to prevent exceeding a thermal limit. Second, by controlling both the operating frequency and voltage of the computer system, there is a reduction in cost due to yield improvement. If the operating voltage can be increased, this will improve the microprocessor yield by enabling the use of certain microprocessors that require greater than the current 3.3 volts for operation when the frequency is at a maximum and using a reduced voltage at lower frequencies. This allows certain companies that produce microprocessors to improve their yield for their fastest microprocessors without sacrificing battery life.

Therefore, a need existed to provide a system and method for reducing the power consumption of a computer system, more specifically a notebook computer system, thereby extending the battery life of the notebook computer. The system and method must be able to vary the operating voltages and frequencies of a plurality of system components (i.e., the system components that drain the most power from the battery, specifically, the microprocessor) to match the current operating conditions of the computer system. If a system component is not doing any meaningful work, both the operating voltage and frequency can be reduced, thereby lowering the power consumption of the notebook computer. The system and method must also allow for an increase in microprocessor yield by allowing the use of microprocessors that operate at a voltage of greater than 3.3 volts at a maximum frequency.

SUMMARY OF THE INVENTION

In accordance with one embodiment of the present invention, it is an object of the present invention to provide a system and method for reducing the power consumption of a computer system, more specifically a notebook computer system.

It is another object of the present invention to provide a system and method that reduces the power consumption of a notebook computer system by controlling the operating voltages and frequencies of at least one of a plurality of system components (i.e., the system components that drain the most power, specifically the microprocessor) to conform with current operating conditions.

It is still another object of the present invention to provide a system and method that controls the operating voltages and frequencies of the microprocessor thereby improving microprocessor yield by allowing the use of microprocessors that operate at a voltage of greater than 3.3 volts at a maximum frequency.

BRIEF DESCRIPTION OF THE PREFERRED EMBODIMENT

In accordance with one embodiment of the present invention, a system for reducing the power consumption of a computer system is disclosed. The system is comprised of a programmable power supply means coupled to at least one of a plurality of system components. The power supply means is used for individually adjusting the operating voltage of the at least one of the plurality of system components based on the current operating conditions of the computer system. A programmable frequency generator means is also coupled to the at least one of the plurality of system components. The programmable frequency generator means is used for individually adjusting the operating frequency of the at least one of the plurality of system components based on the current operating conditions of the computer system. The system could be expanded so that the programmable power supply means and the programmable frequency generator means individually adjusts the operating voltages and frequencies of all of the plurality of system components that consume a large portion of the computer system's power.

In accordance with another embodiment of the present invention, a method for reducing the power consumption of a computer system is disclosed. The method comprises the steps of: providing a system for individually adjusting a frequency and a voltage of a plurality of system components; monitoring current operating conditions of the plurality of system components; adjusting the frequencies of each of the plurality of system components to conform to target frequencies for each of the plurality of system components, the target frequencies being based on current operating conditions; and adjusting the voltages of each of the plurality of system components to conform to the target voltages for each of the plurality of system components, the target voltages being based on the current operating conditions.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 3 shows a chart with the information that was depicted on the graph of FIG. 1 for a conservative approach to controlling both the voltage and the frequency of a microprocessor of a computer placed in tabular form.

FIG. 4 shows a chart with the information that was depicted on the graph of FIG. 1 for an aggressive approach to controlling both the voltage and the frequency of a microprocessor of a computer placed in tabular form.

DETAILED DESCRIPTION OF THE PREFERRED EMBODIMENTS

Figures 1, 2:
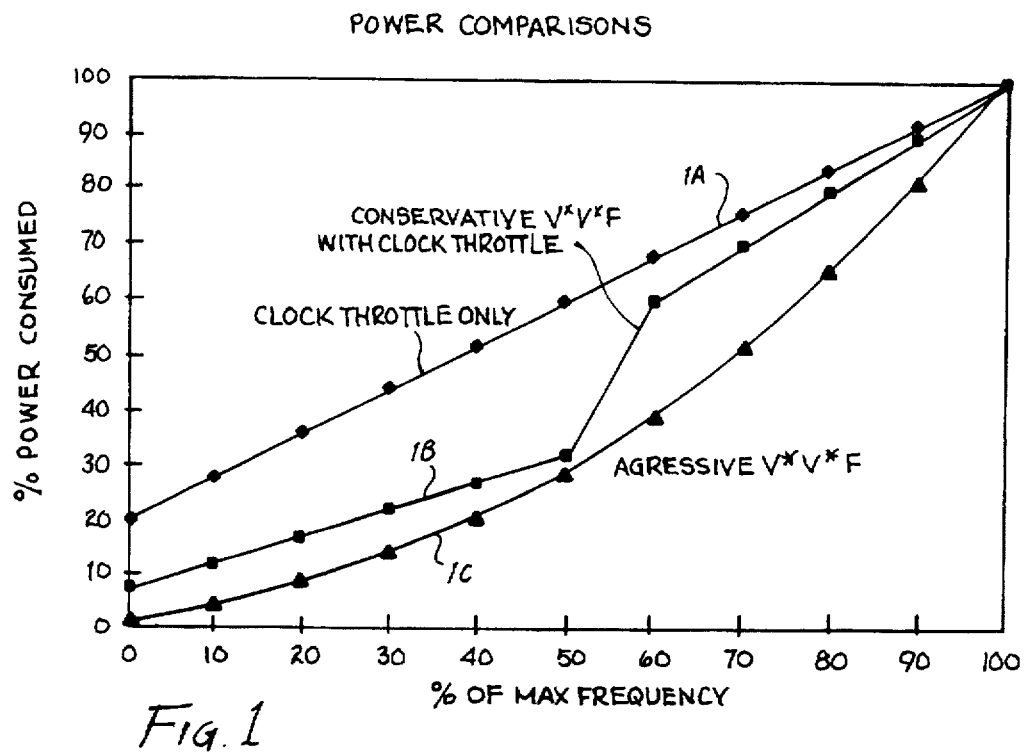
FIG. 1 shows a graph depicting the power savings when the frequency is controlled versus the power savings when both the frequency and voltage is controlled.
FIG. 2 shows a chart with the information that was depicted on the graph of FIG. 1 for clock throttle only placed in tabular form.

Referring to FIGS. 1–4, the advantages of controlling both the operating voltages and frequencies of a plurality of system components, more specifically the microprocessor (hereinafter processor), can be seen. In FIG. 1, the top line 1A represents the power savings that normally occurs in a processor of a notebook computer during clock throttle. When the clock is continuously throttled, the power consumption of the notebook computer is reduced to approximately 20 percent of the maximum value. However, as can be seen from the middle line 1B, when both the operating frequency and the operating voltage of the processor is reduced, the power consumption of the notebook computer may be reduced to approximately 6 percent of the maximum value. At certain frequencies the difference in power consumption between the top line 1A and the middle line 1B is almost 30 percent (at a desired frequency of 50 percent of the maximum value, the power may be reduced to 32 percent of the maximum value by reducing both the operating voltage and frequency, while at the same desired frequency, the power consumed is reduced to only 60 percent of the maximum value by clock throttle only). It should be noted that the middle line 1B reflects a very conservative approach in lowering the operating voltage of the processor. The operating voltage is only lowered to 20 percent of the maximum operating voltage level when the desired frequency is at 50 percent of the maximum level. The operating voltage is held at 80 percent of the maximum value as the desired frequency is further reduced.

Referring now to FIGS. 2 and 3, FIGS. 2 and 3 take the data shown in FIG. 1 and places the data in tabular form. FIG. 2 relates to the current method of reducing power consumption through the use of clock throttling. As indicated in the third column (starting from the left hand side), under the clock throttling method the operating voltage of the processor remains at 100 percent of the maximum operating level. FIG. 3 relates to the present invention whereby both the operating voltage and frequency of the processor is reduced. The frequency assumed column represents the actual processor frequency as a percentage of the maximum frequency. The desired frequency column represents the effective speed of the processor and is a combination of the processor frequency (frequency assumed column) and the clock throttle column.

It should be noted that the present invention is drawn towards a worst case scenario in that the processor frequency (frequency assumed column) is only lowered to 50 percent of the maximum value. This is due to the fact that the frequency cannot be lowered any further without violating certain manufacturers' specifications on their processors. It should further be noted that not all of the manufacturers have these specifications. However, by combining clock throttle with a reduction in frequency, the effective frequency of the processor (desired frequency column) may be reduced all the way to zero percent of the maximum operating frequency value.

Referring now to FIGS. 1 (line 1C) and 4, a more aggressive approach is undertaken. In FIGS. 1 and 4, the voltage is reduced at a rate of one half that of the frequency drop (i.e. if the frequency is reduced 50 percent, the voltage is reduced 25 percent). Under this approach, the difference in power consumption between the present invention, line 1C, and clock throttle only, top line 1A, may be approximately 32 percent (at a relative frequency of 50 percent, the power may be reduced to 28 percent of the maximum value by reducing both the operating voltage and frequency, while at the same relative frequency, the power is reduced to only 60 percent of the maximum value by clock throttling). It should be noted that under the aggressive approach, line 1C, the processor frequency (frequency assumed column in FIG. 4) is reduced from 100 percent of the maximum value to zero percent. Clock throttling was not used in this approach.

Figures 5, 6:
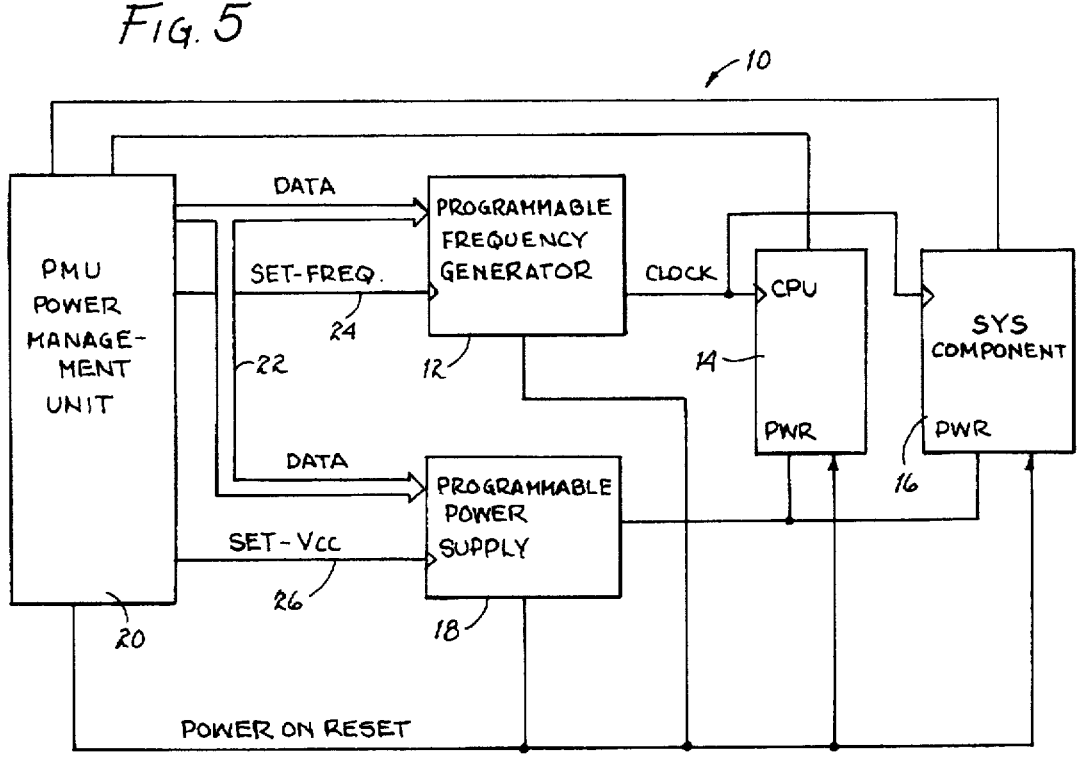
FIG. 5 shows a chart summarizing the power savings that can be achieved by controlling both the operating voltage and the operating frequency of the computer system versus controlling just the operating frequency of the computer system.
FIG. 6 shows a simplified block diagram of a system for altering the current operating voltages and the current operating frequencies of various system components.

Referring to FIG. 5, a table is shown which summarizes the power reduction under the present invention as compared to clock throttling and frequency reduction. As can be seen in the table, the power consumption of a notebook computer that is running at 50 percent of the maximum clock rate can be reduced from 60 percent (clock throttle) to 25 percent with just a 30% reduction in the voltage. This one-third voltage drop provides for about a doubling in the life of the battery which powers the notebook computer.

Referring now to FIG. 6, a system 10 for altering the current operating voltage and the current operating frequency of a processor, as well as other system components, is shown. The system 10 is comprised of a programmable frequency generator 12. The frequency generator 12 is coupled to the processor 14, as well as to other system components 16 that consume a large amount of the computer system's power. Some examples of system component 16 are a system controller and a dynamic random access memory component of the computer system. The frequency generator 12 is used for adjusting the operating frequency of the processor 14, as well as the other system components 16, to conform to the current operating conditions of the computer system. For example, if a system component 16 is not doing any useful work, the frequency generator 12 can reduce the operating frequency of the system component 16 thereby reducing the power consumption of the system component and hence the computer system.

A programmable power supply 18 is also coupled to the processor 14 and to the system components 16 which consumes a large amount of the computer system's power. The power supply 18 is used for adjusting the operating voltages of the processor 14 and the system components 16 to conform to current operating conditions. Using the same example as above, if a system component 16 is not doing any useful work, not only can the frequency generator 12 reduce the operating frequency of the system component 16, but the power supply 18 may also reduce the operating voltage of the system component 16. By reducing both the operating frequency and the voltage of the system component 16, a multiplication in the power savings is had.

A power management unit 20 is coupled to the processor 14 and to each of the system components 16 that consume a large amount of the computer system's power. The power management unit 20 is also coupled to the frequency generator 12 through a data bus 22 and a set frequency line 24 and to the power supply 18 through the data bus 22 and a set Vcc line 26. In operation, the power management unit 20 receives the current operating conditions of the processor 14 and each of the system components 16. If the current operating conditions dictate that the operating frequencies of the processor 14 or any of the system components 16 require changing, the power management unit 20 then sends the new operating frequencies to the frequency generator 12 over the data bus 22. The power management unit sends a signal over the set frequency line 24 to the frequency generator 12 to load the new operating frequencies. The frequency generator 12 then supplies the processor 14 and each of the system components 16 with the new operating frequencies. Likewise, if the current operating conditions dictate that the operating voltages of the processor 14 or any of the system components 16 require changing, the power management unit 20 sends the new operating voltages to the power supply 18 over the data bus 22. The power management unit then sends a signal over the set Vcc line 26 to the power supply 18 to load the new operating voltages. The power supply 18 then supplies the processor 14 and each of the system components 16 with the new operating voltages.

The power management unit 20 is also coupled to the frequency generator 12, the power supply 18, the processor 14, and each of the system components 16 through a power on reset line. When the computer system is started up, or upon resetting the computer system, a signal from the power management unit 20 is sent through the power on reset line to place the frequency generator 12, the power supply 18, the processor 14 and each of the system components into initial operating conditions.

While the invention has been particularly shown and described with reference to preferred embodiments thereof, it will be understood by those skilled in the art that the foregoing and other changes in form and details may be made therein without departing from the spirit and scope of the invention.

I claim:

1. A system for reducing power consumption of a computer system comprising, in combination:

programmable power supply means coupled to at least one of a plurality of system components for individually adjusting an operating voltage of said at least one of said plurality of system components based on current operating conditions of said at least one of said plurality of system components; and programmable frequency generator means coupled to at least one of said plurality of system components for individually adjusting an operating frequency of said at least one of said plurality of system components based on current operating conditions of said at least one of said plurality of system components;

said programmable power supply means being coupled to each of said plurality of system components for individually adjusting operating voltage supplied to each of said plurality of system components based on current operating conditions of each of said plurality of system components such that each of said plurality of system components may be simultaneously supplied with different operating voltages in order to optimize overall system power savings and said programmable frequency generator means being coupled to each of said plurality of system components for individually adjusting operating frequency supplied to each of said plurality of system components based on current operating conditions of each of said plurality of system components such that each of said plurality of system components may be simultaneously supplied with different operating frequencies in order to optimize overall system power savings.

2. A system for reducing power consumption of a computer system in accordance with claim 1 further comprising power management unit means coupled to said programmable frequency generator means and each of said plurality of system components for receiving said current operating conditions of each of said plurality of system components and for controlling said programmable frequency generator means by providing said programmable frequency generator means with said operating frequencies for each of said plurality of system components based on current operating conditions.

3. A system for reducing power consumption of a computer system in accordance with claim 1 further comprising power management unit means coupled to said programmable power supply means and each of said plurality of system components for receiving said current operating conditions of each of said plurality of system components and for controlling said programmable power supply means by providing said programmable power supply means with said operating voltages for each of said plurality of system components based on current operating conditions.

4. A system for reducing power consumption of a computer system comprising, in combination:

programmable power supply means coupled to a plurality of system components for individually adjusting operating voltages of each of said plurality of system components based on current operating conditions of each of said plurality of system components;

programmable frequency generator means coupled to said plurality of system components for individually adjusting operating frequencies of each of said plurality of system components based on current operating conditions of each of said plurality of system components; and power management unit means coupled to said programmable frequency generator means, said programmable power supply means, and each of said plurality of system components for receiving said current operating conditions of each of said plurality of system components and for controlling said programmable frequency generator means by providing said programmable frequency generator means with said operating frequencies for each of said plurality of system components based on current operating conditions such that each of said plurality of system components may be simultaneously supplied with different operating frequencies in order to optimize overall system power savings and for controlling said programmable power supply means by providing said programmable power supply means with said operating voltages for each of said plurality of system components based on current operating conditions such that each of said plurality of system components may be simultaneously supplied with different operating voltages in order to optimize overall system power savings.

5. A system for reducing power consumption of a computer system in accordance with claim 4 further comprising data bus means coupled to said power management means, said programmable frequency generator means, and said programmable power supply means for transferring data to said programmable frequency generator means indicating said operating frequencies that each of said plurality of system components should be operating at under current operating conditions and for transferring data to said programmable power supply means indicating said operating voltages that each of said plurality of system components should be operating at under current operating conditions.

6. A system for reducing power consumption of a computer system in accordance with claim 4 further comprising power on reset line means coupled to said power management unit means, said programmable frequency generator means, said programmable power supply means, and each of said plurality of system components for sending a signal that puts said programmable frequency generator means, said programmable power supply means, and each of said plurality of system components in an initial operating condition.

7. A system for reducing power consumption of a computer system in accordance with claim 4 wherein at least one of said plurality of system components is a central processing unit.

8. A system for reducing power consumption of a computer system in accordance with claim 4 wherein at least one of said plurality of system components is a system controller.

9. A system for reducing power consumption of a computer system in accordance with claim 4 wherein at least one of said plurality system components is a dynamic random access memory component.

10. A system for reducing power consumption of a computer system in accordance with claim 5 further comprising set frequency line means coupled to said power management unit means and said programmable frequency generator means for sending a signal to said programmable frequency generator means to load said data from said power management unit means to alter said operating frequencies of each of said plurality of system components to match current operating conditions.

11. A system for reducing power consumption of a computer system in accordance with claim 5 further comprising set voltage line means coupled to said power management unit means and said programmable power supply means for sending a signal to said programmable power supply means to load said data from said power management unit means to alter said operating voltages of each of said plurality of system components to match current operating conditions.

12. A system for reducing power consumption of a computer system comprising, in combination:

programmable power supply means individually coupled to each of a plurality of system components one of said plurality of system components being a central processing unit for individually adjusting operating voltages of each of said plurality of system components based on current operating conditions of each of said plurality of system components;

programmable frequency generator means individually coupled to said plurality of system components for individually adjusting operating frequencies of each of said plurality of system components based on current operating conditions of each of said plurality of system components;

power management unit means coupled to said programmable frequency generator means, said programmable power supply means, and each of said plurality of system components for receiving said current operating conditions of each of said plurality of system components and for controlling said programmable frequency generator means by providing said programmable frequency generator means with said operating frequencies for each of said plurality of system components based on current operating conditions such that each of said plurality of system components may be simultaneously supplied with different operating frequencies in order to optimize overall system power savings and for controlling said programmable power supply means by providing said programmable power supply means with said operating voltages for each of said plurality of system components based on current operating conditions such that each of said plurality of system components may be simultaneously supplied with different operating voltages in order to optimize overall system power savings;

data bus means coupled to said power management means, said programmable frequency generator means, and said programmable power supply means for transferring data to said programmable frequency generator means indicating said operating frequencies that each of said plurality of system components should be operating at under current operating conditions and for transferring data to said programmable power supply means indicating said operating voltages that each of said plurality of system components should be operating at under current operating conditions;

set frequency line means coupled to said power management unit means and said programmable frequency generator means for sending a signal to said programmable frequency generator means to load said data from said power management unit means to alter said operating frequencies of each of said plurality of system components to match current operating conditions;

set voltage line means coupled to said power management unit means and said programmable power supply means for sending a signal to said programmable power supply means to load said data from said power management unit means to alter said operating voltages of each of said plurality of system components to match current operating conditions; and power on reset line means coupled to said power management unit means, said programmable frequency generator means, said programmable power supply means, and each of said plurality of system components for sending a signal that puts said programmable frequency generator means, said programmable power supply means, and each of said plurality of system components in an initial operating condition.

13. A system for reducing power consumption of a computer system in accordance with claim 12 wherein said plurality of system components further comprises a system controller.

14. A system for reducing power consumption of a computer system in accordance with claim 12 wherein said plurality of system components further comprises a dynamic random access memory component.

15. A method for reducing power consumption of a computer system comprising the steps of:

providing a system for individually adjusting a frequency and a voltage of a plurality of system components;

monitoring current operating conditions of said plurality of system components;

adjusting frequencies of each of said plurality of system components to conform to target frequencies for each of said plurality of system components such that each of said plurality of system components may be simultaneously supplied with different operating frequencies in order to optimize overall system power savings, said target frequencies being based on current operating conditions; and adjusting voltages of each of said plurality of system components to conform to target voltages for each of said plurality of system components such that each of said plurality of system components may be simultaneously supplied with different operating voltages in order to optimize overall system power savings, said target voltages being based on current operating conditions.

16. The method of claim 15 wherein said step of providing a system for individually adjusting a frequency and a voltage of a plurality of system components further comprises the steps of:

providing programmable power supply means coupled to each of a plurality of system components for individually adjusting operating voltages of each of said plurality of system components based on current operating conditions of each of said plurality of system components;

providing programmable frequency generator means coupled to said plurality of system components for individually adjusting operating frequencies of each of said plurality of system components based on current operating conditions of each of said plurality of system components;

providing power management unit means coupled to said programmable frequency generator means, said programmable power supply means, and each of said plurality of system components for receiving said current operating conditions of each of said plurality of system components and for controlling said programmable frequency generator means by providing said programmable frequency generator means with said operating frequencies for each of said plurality of system components based on current operating conditions and for controlling said programmable power supply means by providing said programmable power supply means with said operating voltages for each of said plurality of system components based on current operating conditions.

17. The method of claim 15 wherein said step of monitoring current operating conditions of said plurality of system components further comprises the step of providing a power management unit means coupled to each of said plurality of system components for receiving data on said current operating conditions of each of said plurality of system components.

18. The method of claim 15 wherein said step of adjusting frequencies of each of said plurality of system components to conform to target frequencies for each of said plurality of system components based on current operating conditions further comprises the steps of:

providing programmable frequency generator means coupled to a plurality of system components for individually adjusting operating frequencies of each of said plurality of system components based on current operating conditions;

providing power management unit means coupled to said programmable frequency generator means and each of said plurality of system components for receiving said current operating conditions of each of said plurality of system components and for controlling said programmable frequency generator means by providing said programmable frequency generator means with said target frequencies for each of said plurality of system components based on current operating conditions;

sending said target frequencies for each of said plurality of system components from said power management unit means to said programmable frequency generator means; and sending said target frequencies for each of said plurality of system components from said programmable frequency generator means to each of said plurality of system components for adjusting said current operating frequencies of each of said plurality of system components.

19. The method of claim 15 wherein said step of adjusting voltages of each of said plurality of system components to conform to target voltages for each of said plurality of system components based on current operating conditions further comprises the steps of:

providing programmable power supply means coupled to said plurality of system components for individually adjusting operating voltages of each of said plurality of system components based on current operating conditions of said plurality of system components;

providing power management unit means coupled to said programmable power supply means and each of said plurality of system components for receiving said current operating conditions of each of said plurality of system components and for controlling said programmable power supply means by providing said programmable power supply means with said target voltages of each of said plurality of system components based on current operating conditions;

sending said target voltages for each of said plurality of system components from said power management unit means to said programmable power supply means; and sending said target voltages for each of said plurality of system components from said programmable power supply means to each of said plurality of system components for adjusting said current operating voltages of each of said plurality of system components.

20. A system for reducing power consumption of a computer system comprising, in combination:

programmable power supply means coupled to at least one of a plurality of system components for individually adjusting an operating voltage of said at least one of said plurality of system components based on current operating conditions of said at least one of said plurality of system components;

programmable frequency generator means coupled to said at least one of said plurality of system components for individually adjusting an operating frequency of said at least one of said plurality of system components based on current operating conditions of said at least one of said plurality of system components; and power management unit means coupled to said programmable frequency generator means, said programmable power supply means, and said at least one of said plurality of system components for receiving said current operating conditions of said at least one of said plurality of system components and for controlling said programmable frequency generator means by providing said programmable frequency generator means with said operating frequency of said at least one of said plurality of system components based on current operating conditions such that each of said plurality of system components may be simultaneously supplied with different operating frequencies in order to optimize overall system power savings and for controlling said programmable power supply means by providing said programmable power supply means with said operating voltage for said at least one of said plurality of system components based on current operating conditions such that each of said plurality of system components may be simultaneously supplied with different operating voltages in order to optimize overall system power savings.

21. A system for reducing power consumption of a computer system in accordance with claim 20 further comprising data bus means coupled to said power management means, said programmable frequency generator means, and said programmable power supply means for transferring data to said programmable frequency generator means indicating said operating frequency that said at least one of said plurality of system components should be operating at under current operating conditions and for transferring data to said programmable power supply means indicating said operating voltage that said at least one of said plurality of system components should be operating at under current operating conditions.

22. A system for reducing power consumption of a computer system in accordance with claim 20 further comprising power on reset line means coupled to said power management unit means, said programmable frequency generator means, said programmable power supply means, and said at least one of said plurality of system components for sending a signal that puts said programmable frequency generator means, said programmable power supply means, and said at least one of said plurality of system components in an initial operating condition.

23. A system for reducing power consumption of a computer system in accordance with claim 21 further comprising set frequency line means coupled to said power management unit means and said programmable frequency generator means for sending a signal to said programmable frequency generator means to load said data from said power management unit means to alter said operating frequency of said at least one of said plurality of system components to match current operating conditions.

24. A system for reducing power consumption of a computer system in accordance with claim 21 further comprising set voltage line means coupled to said power management unit means and said programmable power supply means for sending a signal to said programmable power supply means to load said data from said power management unit means to alter said operating voltage of said at least one of said plurality of system components to match current operating conditions.

25. A system for reducing power consumption of a computer system in accordance with claim 21 wherein at least one of said plurality of system components is a central processing unit.

* * * * *